United States Patent Office 3,605,516
Patented Sept. 20, 1971

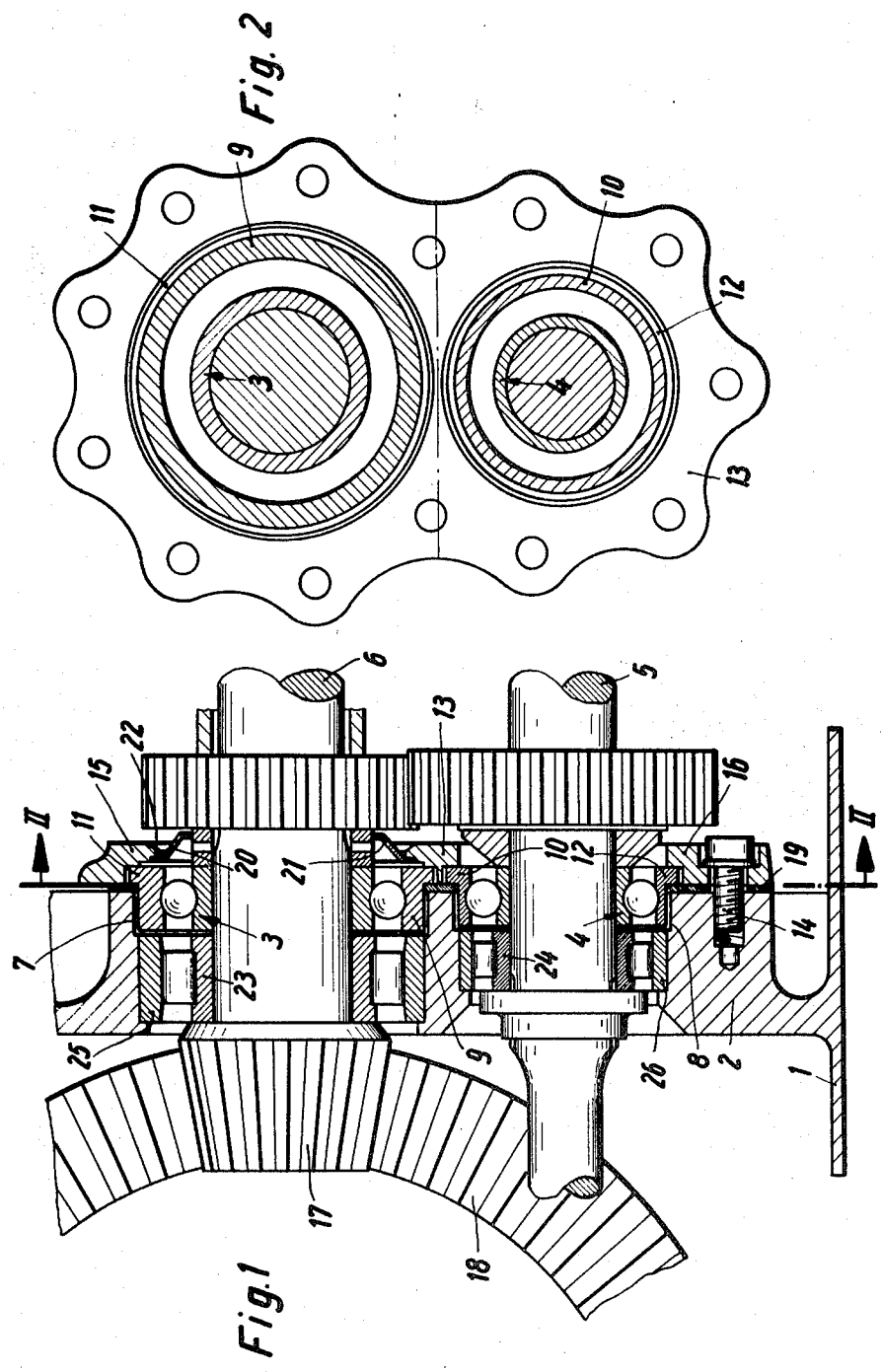

3,605,516
BEARING FOR THE SHAFTS OF A POWER TRANSMISSION COMBINED WITH A DIFFERENTIAL GEAR, ESPECIALLY FOR AUTOMOTIVE VEHICLES
Otto Hausinger, Gerlingen, Germany, assignor to Firma Dr.-Ing. h.c.F. Porsche K.G., Stuttgart-Zuffenhausen, Germany
Filed Mar. 13, 1970, Ser. No. 19,398
Claims priority, application Germany, Mar. 18, 1969,
P 19 13 562.7
Int. Cl. F16c 21/00; F16h 35/08
U.S. Cl. 74—401
31 Claims

ABSTRACT OF THE DISCLOSURE

Bearing for the shafts of a change speed gear combined with a differential gear, especially for automotive vehicles, with several gear shafts disposed in adjacent relationship such as side-by-side or one above the other. The drive pinion of the crown wheel is fixedly connected to the gear output shaft of the change speed gear. The output shaft is supported in a radial ball bearing fashioned as a sliding bearing and in an axial bearing fashioned as a fixed bearing in a partition of the transmission case. Axial adjustment of the drive pinion is effected by shims.

BACKGROUND OF THE INVENTION

The present invention relates to a bearing for the shafts of a power transmission combined with a differential gear, especially for automotive vehicles, and more particularly, to a bearing with several gear shafts disposed side-by-side or one above the other, wherein the drive pinion of the crown wheel is fixedly connected with the output shaft of the transmission. The output shaft is supported in a radial ball bearing constructed as a sliding bearing and in an axial bearing constructed as a fixed bearing in a partition or transverse wall of the transmission case, wherein the axial adjustment of the drive pinion is effected by shims or adjusting plates. It is a main object of the present invention to improve transmissions of this type with respect to the power handling capacity and assembly thereof.

In a conventional type of construction, the gear input and output shafts, together with an auxiliary shaft, are supported by roller bearings within the portion of the housing associated with the transmission, in two partitions of the housing which are apart from each other. In this connection, the main gear shafts, that is the input shaft and the output shaft, are supported in the partition of the housing adjacent the differential gear, in each case by means of radial roller bearings fitted into the bearing recesses of the housing wall with a sliding seat, and in the partition of the housing removed therefrom by means of axial bearings which are arranged in the bearing recesses of this housing wall so that they are secured against axial displacement. A drive pinion for the crown wheel of the differential gear is fixedly connected with the gear output shaft. In this connection, the axial adjustment of the drive pinion with respect to the crown wheel is effected by the insertion of shims beside the fixed bearing of the output shaft.

Since, for adjusting the drive pinion in this manner, the insertion of one or several shims is necessary in most cases, there necessarily occurs, simultaneously with the change in the axial adjustment of the drive pinion, also a shift of the gear wheels disposed on the output shaft with respect to the gear wheels arranged on the other shafts of the transmission. In order to be able to transmit te torque of the driving engine safely in spite of this axial displacement between the gear wheels on the gear output shaft and the gear wheels disposed on the other gear shafts, which displacement is more or less large from the case to case, correspondingly wider gear wheels are generally employed which ensure in each case a sufficient meshing with or covering of the tooth surfaces. However, a wider breadth of the gear wheels means an undesired, considerable increase in the weight of the entire transmission system and also a greater length of the main gear shafts, which consequently experience an undesirable greater bending upon load.

Furthermore, the arrangement of the shaft bearings of the conventional construction is meant for power transmissions disposed in housings divided in the longitudinal direction, and wherein a removal of the entire gear system is necessary anyway for exchanging the gear wheel sets. Therefore, with respect to racing vehicles, for example, wherein it is necessary to exchange the gear wheel sets rather often and rapidly, the arrangement and construction of the shaft bearings employed in the conventional construction appears disadvantageous.

SUMMARY OF THE INVENTION

It is the aim of the present invention to provide a bearing for the shafts of a power transmission of the type of construction set forth above, wherein an axial displacement between the gear wheels disposed on the gear output shaft and the gear wheels arranged on the other gear shafts is avoided as a consequence of the axial adjustment of the drive pinion.

It is a further object of the present invention whereby there is provided an arrangement of the shaft bearings which makes it possible to install and remove the gear shafts with the gear wheel sets in a simple manner.

The underlying problems are solved in accordance with the present invention by providing that the shafts of the power transmission are supported in the housing wall receiving the fixed bearing of the gear output shaft so that they rest in the direction of thrust by way of axial bearings against a common lid or cover connected by, for example, threaded means with the housing wall.

For the axial adjustment of the drive pinion, shims or adjusting plates are provided which can be inserted between the lid and the housing wall and extend behind the radial shoulders of the outer rings of the axial bearings. In this connection, the lid is preferably provided with projections or overhanging portions extending over the radial shoulders of the outer rings of the axial bearings in such a manner that the shoulders contact, on one hand, the inner sides of the projections and, on the other hand, the housing wall or the shim under a contact pressure. In order to ensure the supply of lubricating oil for the axial bearings, frustoconical oil baffles are provided which engage, in each case, into recesses arranged at the inner sides of the projections of the lid by means of a radially bent, planar edge and are held by the contact pressure effective between the lid and the shoulders of the outer rings of the axial bearings.

An extremely simple installation and removal of the gear wheel sets and/or the gear shafts of a power transmission disposed in a transmission case which is divided at right angles to the axes of the shafts is effected by providing the fixed bearing of the output shaft in the housing wall adjoining the differential gear. In this connection, the further provision is made, in accordance with an especially preferred individual embodiment of the invention, that at least the gear output shaft is supported, in the housing partition adjoining the differential gear by means of a paired roller bearing consisting of a radial bearing constructed as a cylindrical roller or tubular bearing, and an axial bearing constructed as an angular contact bearing.

In this type of bearing, in order to be able to pull the gear shafts out of their bearing and insert them in the bearing in a simple manner for the purpose of assembly or disassembly after the lid supporting the axial bearings in the thrust direction has been removed, the further provision is made in accordance with the present invention that the outer ring of the radial bearing is seated by means of a force fit and the outer ring of the axial bearing is seated by means of a sliding fit in the bearing recess of the housing wall. The radial bearings are preferably constructed as cylindrical or tubular bearings since this type of bearing can best compensate for any inaccuracies which may accur in the fit.

All-in-all, the selection and combination of bearing types or bearing pairs to be employed in an individual case are dependent on the respective load conditions of the power transmission so that the invention is, of course, not limited to the use of specific types of bearings or pairs of bearings. For example, in certain cases, the axial bearings can advantageously be represented by conical-roller or tapered-roller bearings. The disposition of the fixed bearings of all gear shafts in the same partition of the fixed bearings of all gear shafts in the same partition of the transmission case and the support thereof by means of a single lid covering all shaft bearings makes it possible to utilize shims which uniformly influence the position of the fixed bearings of all gear shafts, so that a change in the mutual position of the gear shafts by the axial adjustment of the drive pinion for the crown wheel is avoided.

The prevention of an axial displacement among the gear wheels disposed on the individual gear shafts ensures a uniform meshing of the engaging tooth surfaces of the cooperating gear wheels even in case a substantial axial adjustment of the drive pinion is necessary. This makes it possible to construct the gear wheels to be narrower and thus to provide a shorter length for the gear shafts, so that a smaller bending stress on the shafts is attained with a lower total weight of the power transmission.

Since the gear shafts are furthermore supported in the housing partition adjoining the differential gear by way of a roller bearing pair consisting of an angular contact bearing seated in the bearing recess of the housing wall with a sliding fit and of a cylindrical or tubular bearing, the outer ring of which is seated in the bearing recess of the housing wall with a force or press fit, it is possible to install and remove the gear shafts many times, without any large amount of work or auxiliary tools, merely by pulling the gear shafts out of the bearings and inserting them into the bearings without there being the danger of damage to a bearing or to a bearing seat. The construction of the radial bearing as a cylindrical or tubular bearing, in particular, has a favorable effect in this connection, due to the adaptability of this type of bearing.

BRIEF DESCRIPTION OF THE DRAWING

These and further advantages, features and objects of the present invention will become more apparent from the following description when taken in conjunction with the accompanying drawings which show, for purposes of illustration only, an embodiment in accordance with the present invention, and wherein:

FIG. 1 is a partial sectional view of a power transmission for an automotive vehicle provided with a shaft bearing arrangement according to the present invention, and FIG. 2 is a section along line II—II of FIG. 1.

DETAILED DESCRIPTION OF THE DRAWING

Referring now to the drawings and, in particular, to FIG. 1, a transmission case 1 receiving in one of its areas a differential gear and in its other region a change-speed gear is provided with a partition or transverse wall 2 separating the differential gear from the power transmission. In the partition 2, there are provided fixed bearings 3 and 4 of the gear input shaft 5 and the gear output shaft 6. The fixed bearings 3 and 4 are fashioned as roller bearings and are fitted with a sliding fit into corresponding bearing recesses 7, 8 of the housing wall 2. The outer rings 9 and 10, respectively, of the angular contact bearings 3 and 4 are provided with radial shoulders 11, 12 by means of which they extend over the rims of the bearing recesses 7, 8.

In the thrust direction, the roller bearings 3 and 4 rest against a common lid or cover 13 which is threadedly connected with the housing wall 2 by means of, for example, screws 14. The lid 13 is provided with projections 15 and 16 in the zone of the shaft bearings. The shoulders 11, 12 of the outer rings 9 and 10 contact the inner sides of these projections under pressure. For the axial adjustment of the drive pinion 17 for the crown wheel 18, which drive pinion is fixedly connected with the gear output shaft 6, shims or adjusting plates 19 are provided which can be inserted between the lid 13 and the housing wall 2. The shims 19 are furthermore arranged and constructed in such a manner that they extend beneath the shoulders 11, 12 of the outer rings 9 and 10 of the roller bearings 3 and 4, so that both gear shafts 5 and 6 are uniformly displaced during axial adjustment of the drive pinion 17. To ensure that the roller bearing 3 is supplied with lubricating oil, a frustoconical oil baffle 20 is provided which extends by way of a radially bent, planar edge 21 into a recess 22 arranged on the inner side of the projections 15.

The gear shafts 5 and 6 are supported in the bearing recesses 7 and 8 in each case by means of a paired roller bearing, consisting of an axial bearing which simultaneously forms the fixed bearing 3 and 4, respectively, and a radial bearing 23, 24. The radial bearings 23, 24 are constructed as tubular or cylindrical bearings, the outer rings 25 and 26 of the radial bearings 23, 24 being seated in the bearing recesses 7, 8 with a force fit. Both roller bearings are fixedly seated on the gear shafts 5 and 6.

This bearing construction makes it possible, after removing the lid 13, to simply pull the gear shafts 5 and 6 out of the bearings, together with the roller bearings 3 and 4 seated with a sliding fit in the bearing recesses 7 and 8, and the inner rings 27 and 28, as well as the bearing roller 29 and 30, respectively. Conversely, the installation of the gear shafts 5 and 6 can be effected in an equally simple manner by just inserting the shafts into the bearings and then attaching the lid.

While I have shown and described only one embodiment in accordance with the present invention, it is to be clearly understood that the same is susceptible to numerous changes and modifications as will be apparent to one of ordinary skill in the art. For example, it is possible to construct the shims 19 in two parts as indicated by the dot-dash lines of FIG. 2. In addition, the bearing adjustment of the present invention is not dependent upon any specific combination of roller bearings. I, therefore, do not wish to be limited to the details shown and described herein, but intend to cover all such changes and modifications that are encompassed by the scope of the present invention.

I claim:

1. Bearing for the shafts of power transmission means and differential gear means, particularly for automotive vehicles, with a plurality of gear shaft means located in adjacent relationship with respect to each other, the differerential gear means including a drive pinion and a crown wheel, one of the gear shaft means constituting an output shaft of the power transmission means, the drive pinion being operatively connected with the output shaft, and the output shaft being supported in a sliding radial bearing means and in a fixed axial bearing means located at a partition of a housing for the power transmission means, wherein shim means are provided for axial adjustment of the drive pinion.

2. Bearing according to claim 1, wherein the gear shaft means of the power transmission means are supported in the partition in the thrust direction by the axial bearing means against lid means connected with the partition.

3. Bearing according to claim 2, wherein the axial bearing means are provided with outer rings having radial shoulders, and the shim means being located between the lid means and the partition and extending behind the radial shoulders.

4. Bearing according to claim 3, wherein threaded maens are provided for connecting the lid means and the partition.

5. Bearing according to claim 1, wherein the drive pinion is fixedly connected with the output shaft.

6. Bearing according to claim 3, wherein projections are provided on the lid means, which projections extend over the radial shoulders.

7. Bearing according to claim 6, wherein the radial shoulders contact the insides of the projections and the partition under pressure.

8. Bearing according to claim 6, wherein the radial shoulders contact the insides of the projections and the shim means under pressure.

9. Bearing according to claim 2, wherein projections are provided on the lid means, which projections are provided with recess means on the inner side thereof for receiving approximately frusto-conical oil baffle means having a radially-bent, planar edge.

10. Bearing according to claim 9, wherein the axial bearing means are provided with outer rings having radial shoulders, and the shim means being located between the lid means and the partition and extending behind the radial shoulders.

11. Bearing according to claim 10, wherein the projections extend over the radial shoulders.

12. Bearing according to claim 11, wherein the radial shoulders contact the insides of the projections and the partition under pressure.

13. Bearing according to claim 11, wherein the radial shoulders contact the insides of the projections and the shim means under pressure.

14. Bearing according to claim 1, wherein the fixed axial bearing is located in the partition adjoining the differential gear means.

15. Bearing according to claim 14, wherein the gear shaft means of the power transmission means are supported in the partition in the thrust direction by the axial bearing means against lid means connected with the partition.

16. Bearing according to claim 15, wherein the axial bearing means are provided with outer rings having radial shoulders, and the shim means being located between the lid means and the partition and extending behind the radial shoulders.

17. Bearing according to claim 16, wherein projections are provided on the lid means, which projections extend over the radial shoulders.

18. Bearing according to claim 17, wherein the radial shoulders contact the insides of the projections and the partition under pressure.

19. Bearing according to claim 17, wherein the radial shoulders contact the insides of the projections and the shim means under pressure.

20. Bearing according to claim 17, wherein the projections are provided with recess means on the inner side thereof for receiving approximately frusto-conical oil baffle means having a radially-bent, planar edge.

21. Bearing according to claim 3, wherein at least the output shaft is supported in the partition adjoining the differential gear means by the axial bearing means comprising a paired roller bearing and constituting an angular contact bearing, and by the radial bearing means comprising a cylindrical bearing.

22. Bearing according to claim 21, wherein projections are provided on the lid means, which projections extend over the radial shoulders.

23. Bearing according to claim 22, wherein the radial shoulders contact the insides of the projections and the partition under pressure.

24. Bearing according to claim 22, wherein the radial shoulders contact the insides of the projections and the shim means under pressure.

25. Bearing according to claim 21, wherein projections are provided on the lid means, which projections are provided with recess means on the inner side thereof for receiving approximately frusto-conical oil baffle means having a radially-bent, planar edge.

26. Bearing according to claim 25, wherein the projections extend over the radial shoulders.

27. Bearing according to claim 21, wherein the fixed axial bearing is located in the partition adjoining the differential gear means.

28. Bearing according to claim 21, wherein the outer rings are provided with a sliding seat, and the radial bearing means having outer rings having a force fit into a bearing recess of the partition.

29. Bearing according to claim 1, wherein the axial bearing means comprises a conical roller bearing.

30. Bearing according to claim 1, wherein the radial bearing means comprises cylindrical roller bearings.

31. Bearing according to claim 30, wherein the axial bearing means comprises a conical roller bearing.

References Cited

UNITED STATES PATENTS

| | | | |
|---|---|---|---|
| 1,765,705 | 6/1930 | Smith | 308—174X |
| 2,444,773 | 7/1948 | Gondek | 74—401 |
| 2,982,587 | 5/1961 | Fraser et al. | 308—174 |
| 3,124,061 | 3/1964 | Studli, Sr. | 74—401X |

ARTHUR T. McKEON, Primary Examiner

U.S. Cl. X.R.

308—174